Aug. 22, 1944. A. R. PERKINS 2,356,690
COMBINED VEHICLE BODY FRAME AND CHASSIS
Filed July 23, 1941 3 Sheets-Sheet 1
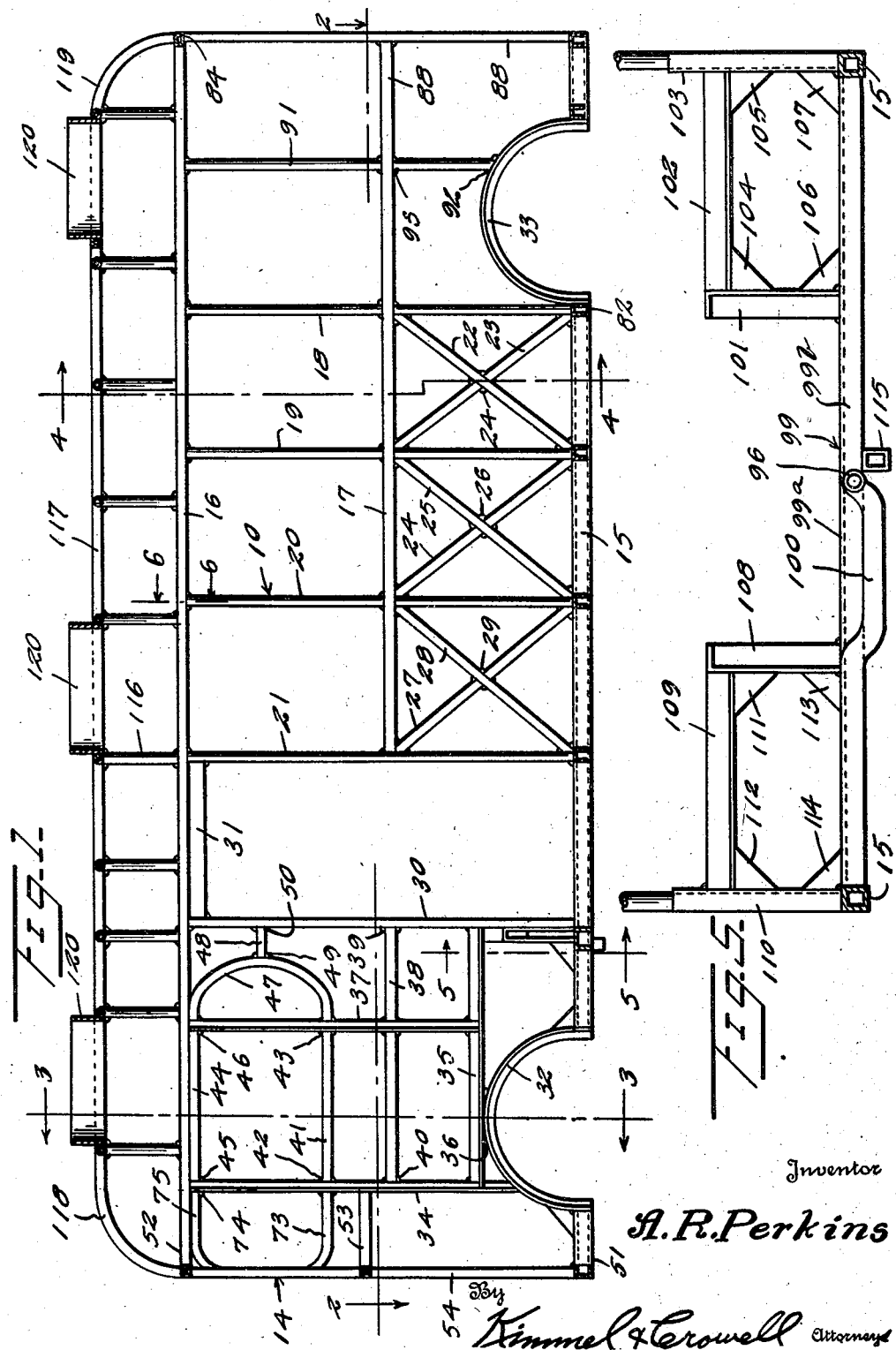
Inventor
A. R. Perkins
By Kimmel & Crowell Attorneys

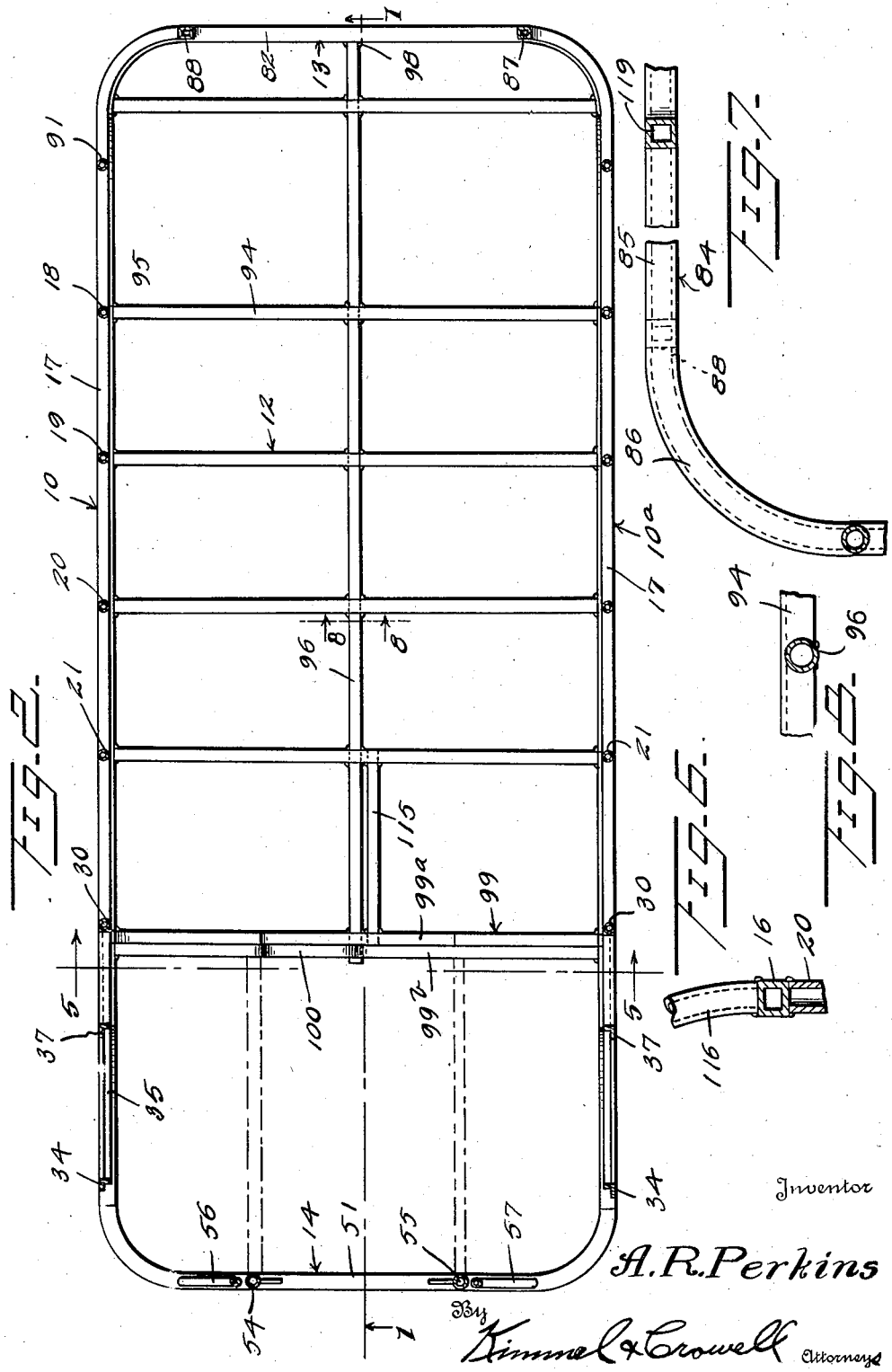

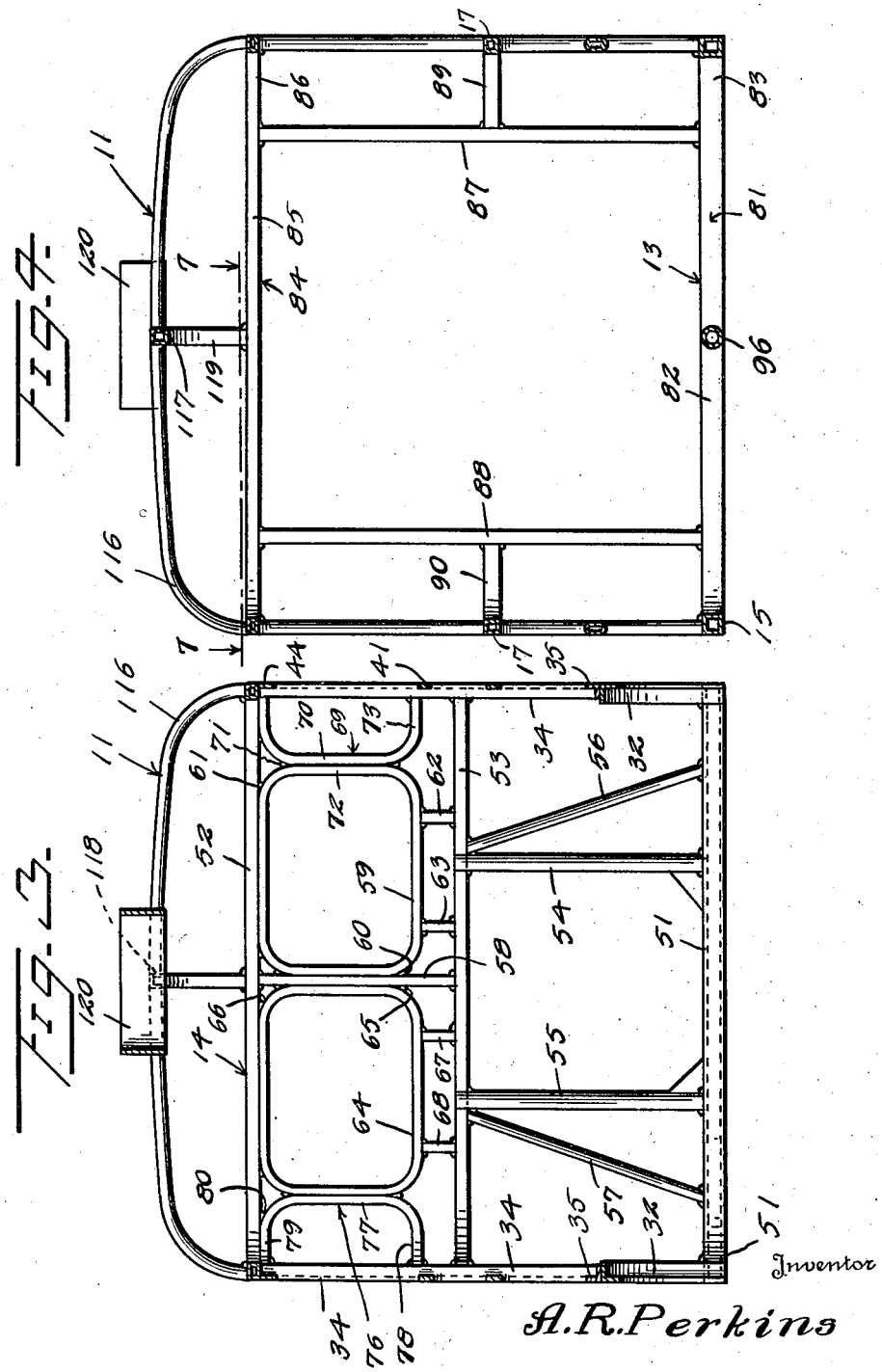

Patented Aug. 22, 1944

2,356,690

UNITED STATES PATENT OFFICE 2,356,690

COMBINED VEHICLE BODY FRAME AND CHASSIS

Arthur R. Perkins, Oneonta, N. Y.

Application July 23, 1941, Serial No. 403,731

2 Claims. (Cl. 296—28)

This invention relates to truck or vehicle body frames, and is an improvement over the frame structure embodied in my Patent No. 2,196,939, which issued on April 9, 1940.

An object of this invention is to provide a vehicle frame which is so constructed as to permit elimination of the conventional chassis frame.

Another object of this invention is to provide a combined chassis and body frame for a vehicle which also have incorporated therein elements for receiving a power plant assembly frame, so that the two frames may be constructed as separate units and subsequently combined together to thereby form a substantially unitary structure.

A further object of this invention is to provide a vehicle body frame which is constructed out of tubular frame members which may be either round or square in transverse section or may be a combination of round and square tubular frame members.

A further object of this invention is to provide a vehicle body frame in combination with a drop or downwardly offset rear axle which will permit the positioning of the floor of the body at a much lower level than is at present possible and also eliminate a transverse rear axle well or cover.

To the foregoing objects and to others which may hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a longitudinal vertical section of a combined vehicle body frame and chassis constructed according to an embodiment of this invention and taken on the line 1—1 of Figure 2, Figure 2 is a sectional view taken on the line 2—2 of Figure 1, Figure 3 is a sectional view taken on the line 3—3 of Figure 1, Figure 4 is a sectional view taken on the line 4—4 of Figure 1, Figure 5 is a sectional view taken on the line 5—5 of Figure 2, Figure 6 is a fragmentary sectional view taken on the line 6—6 of Figure 1, Figure 7 is a sectional view taken on the line 7—7 of Figure 4, and Figure 8 is a fragmentary sectional view taken on the line 8—8 of Figure 2.

Referring to the drawings, the numerals 10 and 10$^a$ designate generally a pair of upright or vertical skeleton side wall members, the numerals 11 and 12 designate generally skeleton top and bottom wall members respectively and the numerals 13 and 14 designate generally the skeleton rear and front wall members forming the skeleton or open frame structure, which is so constructed as to eliminate the necessity for providing a chassis. The side wall members 10 and 10$^a$ are of substantially like construction and each includes a lower channel or tubular frame member 15 extending longitudinally of the frame structure and each side wall member also includes a longitudinally extending upper tubular frame member 16 disposed in upwardly spaced parallel relation to the lower frame member 15.

An intermediate tubular frame member 17 is disposed in spaced parallel relation with respect to the lower and upper frame members 15 and 16 and is secured to a plurality of upright or vertical tubular members 18, 19, 20 and 21. The upright tubular members 18 to 21 inclusive are welded or otherwise fixedly secured at their lower and upper ends to the lower and upper frame members 15 and 16 respectively and the intermediate frame member 17 is also welded or otherwise fixedly secured to the uprights 18 to 21 inclusive. A pair of crossed bracing members 22 and 23 are disposed between the uprights 18 and 19 and may be welded together, as at 24, at their crossing points and the bracing members 22 and 23 are also adapted to be welded to the lower frame member 15 and the intermediate frame member 17 together with the uprights 18 and 19.

A second pair of crossed bracing members 24 and 25 are disposed between the uprights 19 and 20 and are welded at the opposite ends thereof to the lower and intermediate frame members 15 and 17 and are also welded together at their crossing points as at 26. The bracing members 24 and 25 are also adapted to be welded to the adjacent sides of the uprights 19 and 20. Another pair of crossed bracing members 27 and 28 are welded together at their cross points as at 29 and are also adapted to be welded at the opposite ends thereof to the lower and intermediate frame members 15 and 17 and also to the adjacent sides of the uprights 20 and 21.

An upright 30 is disposed in forwardly spaced parallel relation with respect to the upright 21 and is secured as by welding or the like between the lower and upper frame members 15 and 16. The upright 21 and the upright 30 form a doorway and preferably an elongated bar or strip 31 is welded between the upper ends of the uprights 21 and 30 and may also be welded to the under side of the upper tubular member 16. A substantially semi-circular upstanding well forming member 32 is welded or otherwise fixedly secured to the forward end of the lower frame member 15. The well forming member 32 is formed preferably of angle iron and is adapted to loosely engage about a wheel. A rear substantially semi-circular well forming member 33 which is formed of angle iron is welded or otherwise fixedly secured to the rear end of a lower frame member 15 and is adapted to have a wheel loosely mounted therein.

Each side wall 10 has secured to the well 32 at a point forwardly of the vertical axis thereof an upright angle member 34. The angle member 34 extends up to the forward end of the upper frame member 16 and is adapted to be fixedly secured thereto as by welding or the like. A horizontally disposed angle member 35 is adapted to be secured at its rear end as by welding or the like to the forward side of the upright door frame member 30 and is also adapted to be welded to the upright angle member 34. The horizontal angle member 35 may also be welded to the upper side, as at 36, of the well forming member 32. A second upright angle member 37 is disposed rearwardly of the forward upright angle member 34 and is positioned in forwardly spaced parallel relation with respect to the upright tubular door frame forming member 30.

The upright angle member 37 is welded or otherwise fixedly secured at its lower end to the horizontal angle member 36 and is welded or otherwise fixedly secured at its upper end to the upper tubular member 16. A horizontally disposed elongated bar 38 is disposed in upwardly spaced parallel relation with respect to the horizontal angle member 35 and may be formed of a flat strip of metal, which is welded at its rear end as at 39 to the upright tubular member 30. The bar 38 may be welded to the outer side of the upright angle member 37 and may also be welded at its forward end as at 40 to the forward angle member 34.

A horizontally disposed bar or strip 41 is positioned between the two upright angle members 34 and 37 being welded to the angle members as at 42 and 43 respectively. The bar 41 is adapted to form the lower edge portion of a window frame structure and a second window frame forming bar 44 is disposed in upwardly spaced parallel relation with respect to the bar 41 and is secured as at 45 and 46 to the angle members 34 and 37 respectively. The upper edge of the bar 34 may also be welded or otherwise fixedly secured to the under side of the upper frame member 16. An arcuate or semi-elliptical window frame forming member 47 is welded to the rear side of the upright angle member 37 and extends rearwardly therefrom. A connecting or bracing bar 48 is welded as at 49 to the arcuate bar 47 and may also be welded as at 50 to the forward side of the upright 30.

The front wall structure 14 includes a lower channel or tubular frame member 51, which is longitudinally bowed and also includes an upper bowed frame member 52 of tubular construction. An intermediate bowed tubular member 53 is disposed between the lower and upper front frame members 51 and 52 and is welded at the opposite ends thereof to the forward upright angle members 34. The lower bowed frame member 51 is welded at the free rear ends thereof to the lower front portion of the well forming member 32. The upper bowed frame member 52 may be welded or formed integrally with the upper tubular frame member 16.

A pair of vertically disposed tubular posts 54 and 55 are disposed between the lower frame member 51 and the intermediate frame member 53. The opposite ends of the posts or motor chassis supporting members 54 and 55 are adapted to be welded to the lower and intermediate frame members 51 and 53. A pair of angled bracing members 56 and 57 are disposed between the lower and intermediate frame members 51 and 53 on the outer sides of the posts or supporting members 54 and 55. The bracing members 56 and 57 are inclined to the vertical being disposed in upwardly convergent relation with their upper ends welded to both the intermediate frame member 53 and the posts 54 and 55 respectively. The lower ends of the bracing members 56 and 57 are welded to the upper side of the lower frame member 51.

A centrally disposed upright frame member 58 is welded between the upper frame member 52 and the intermediate frame member 53. The intermediate upright member 58 is disposed substantially centrally between the supporting members 54 and 55 and extends upwardly therefrom. A substantially rectangularly-shaped window or panel supporting member 59 is disposed at one side of the upright 58 being welded along one side as at 60 to the adjacent side of the upright 58 and welded as at 61 to the under side of the upper frame member 52. A pair of relatively short connecting members 62 and 63 are welded between the lower side of the rectangular frame 58 and the intermediate frame member 53.

A second rectangular frame structure 64 is disposed on the opposite side of the upright 58 being welded as at 65 to the upright 58 and welded as at 66 to the upper frame member 52. A pair of spaced apart connecting members 67 and 68 are interposed between the lower side of the frame member 64 and the intermediate member 53, being welded between the frame 64 and the frame member 53. A substantially U-shaped frame member 69 has the bight 70 thereof welded as at 71 to the outer side 72 of the frame 59 and the parallel legs 73 of the U-frame 69 are longitudinally bent so as to substantially conform to the curved configuration of the upper and intermediate frame members 52 and 53. The rear ends of the parallel sides 73 of the U member 69 are welded as at 74 to the upright angle member 34 and the uppermost side 75 of the U member 69 may be welded to the under side of the outer arcuate portion of the upper frame member 52. A second U-shaped window frame member 76 has the bight 77 thereof welded as at 78 to the outer vertical side of the rectangular frame 64 and the parallel legs 78 and 79 thereof are longitudinally bent and extend rearwardly, being welded to the adjacent upright 34. The upper leg 79 may be welded as at 80 to the adjacent arcuate edge of the upper frame member 52.

The rear wall structure 13 includes a lower channel or tubular member 81, which is formed with a straight intermediate portion 82 and arcuate opposite end portions 83. The arcuate opposite end portions 83 may be welded to the rear end portions of the rear well forming members 33. An upper rear frame member 84 is formed with a substantially straight intermediate portion 85 and arcuate opposite end portions 86, which may be formed integrally with or be welded to the rear end portions of the upper tubular frame members 16. A pair of door frame forming uprights 87 and 88 are welded between the lower rear frame member 81 and the upper frame member 85. The upright frame members 87 and 88 are spaced apart a distance sufficient to provide a relatively wide door and in practice are disposed at the point of mergence of the arcuate end portions of the frame members 81 and 84 with the intermediate straight portions 82 and 85 respectively. An intermediate arcuate frame member 89 is disposed between the lower and upper arcuate frame members 83 and 86 and is welded at one end to the upright 87.

The opposite end of the arcuate end member 89 may be formed integrally with or be welded to the rear end portion of an intermediate side frame member 17. The upright 88 also has welded thereto an intermediate longitudinally arcuate frame member 90, which may also be welded or otherwise fixedly secured to or formed integrally with the adjacent side tubular frame member 17. A rear upright frame member 91 is disposed between the rear upright frame member 18 and the rear frame structure, being secured at its upper end to the rear portion of the upper frame member 16 and secured at its lower end as at 92 to the upper side of the well forming member 33 at a point forwardly from the rear or lower end portion thereof. The intermediate portion of the upright 91 may be welded as at 93 to the intermediate frame member 17.

The bottom wall structure 12 comprises a plurality of longitudinally spaced apart parallel transversely disposed channel or tubular members 94, which are welded as at 95 to the lower frame member 15. A longitudinally extending tubular torsional member 96 extends longitudinally through the transverse median of each floor member 94 being welded thereto as at 97. The rear end portion of the tubular member 96 may also be welded as at 98 to the forward side of the rear frame member 82. The forward end portion of the tubular member 96 terminates rearwardly of the front wall structure 14 and preferably is welded to a forward floor member 99, which may be constructed in the form of a pair of channel members 99ᵃ and 99ᵇ disposed in side-by-side relation and welded together.

The forward one 99ᵇ of the two channel members 99 may be formed with a downwardly offset intermediate portion 100 within which the lower end portion of the transfer housing forming the subject matter of my copending application filed of even date herewith may loosely engage. Preferably the channel member 99 may be formed as a part of the motor supporting frame or chassis which also forms the subject matter of my copending application for a power plant frame filed of even date herewith. A vertically disposed angle member 101 is adapted to be secured to the upper side of the forward bottom member 99 at one side of the tubular member 96 and a horizontally disposed angle member 102 is welded to the vertical angle member 101 and is also welded to a vertically disposed angle member 103. The lower end of the angle member 103 may be welded or otherwise secured to the lower frame member 15. A triangular bracing member or gusset 104 is disposed between the angle formed by the upright 101 and the horizontal member 102 and an outer upper gusset or bracing member 105 is welded to the upright 103 and the angle member 102. A pair of lower triangular bracing members 106 and 107 are welded to the lower channel member 99 and the uprights 101 and 103 respectively. A second upright angle member 108 is welded at its lower end to the forward channel member 99 at the opposite side of the central tubular member 96 and an upper angle member 109 is welded between the upright 108 and an outer upright 110. A pair of triangular bracing members 111 and 112 are welded between the upright 108 and the horizontal member 109 and between the upright 110 and the horizontal member 109. A pair of lower triangular bracing members 113 and 114 are welded between the upright 108 and the transverse channel member 99 and the channel member 99 and the upright 110 respectively.

The pair of rectangular frame structures formed by the forward channel member 99ᵇ and the uprights 101 and 103 and the horizontal member 102 together with the uprights 108 and 110 and the horizontal member 109 form part of the rear portion of the motor chassis, more specifically described in my copending application filed of even date herewith. The forward channel member 99ᵃ is connected with the next adjacent channel member 94 by means of a longitudinally extending channel member 115, which is disposed at one side of and in spaced parallel relation with respect to the longitudinal tubular member or torsion tube 96.

The top wall structure 11 comprises a plurality of longitudinally bowed transversely extending tubular members 116, which are disposed in upright position and which have the lower free ends thereof welded to the upper side of the upper frame members 16. A centrally disposed and longitudinally extending tubular member 117 is welded to the central portions of the bowed members 116 and is provided with curved portions 118 and 119 at the opposite ends thereof which extend downwardly and are welded to the upper front frame member 52 and the rear upper frame member 84 respectively.

A plurality of box-like frame members 120 are welded between certain pairs of the bowed top wall forming members 116, being positioned in substantially the longitudinal center of the top wall structure 11. These box-like frame members 120 provide a means whereby a ventilating plate or cap may be mounted above the top wall structure 11.

The combined truck or vehicle body frame and chassis hereinbefore described is adapted to be formed substantially out of tubular material, which may be partly round in transverse section and partly square in transverse section and may also be formed out of channel members in certain parts thereof. The several tubular or channel members comprising the frame structure are adapted to be entirely welded together where the several parts are connected with or touching each other so as to form a substantial integral or rigid frame structure, thereby eliminating the necessity of providing an extra chassis which may be secured to the bottom wall of the truck structure, as is the usual method of forming a truck or vehicle body. The rear wheels are adapted to engage in the rear well forming members 33 and preferably a drop rear axle structure similar to that embodied in my copending application is adapted to be secured to the under side of the frame structure hereinbefore described and to extend therebelow. The motor chassis or supporting frame structure may be welded or otherwise fixedly secured within the forward portion of the frame structure, being preferably welded within the frame structure with the forward portions of the motor frame welded to the supporting posts 54 and 55 and the rear portions of the motor frame or chassis welded to the forward side of the transverse channel or tubular member 99ᵃ with the ends of the rear portion of the motor supporting frame welded between the two lower side frame members 15, as shown in Figure 5.

What I claim is:

1. A skeleton metal body frame structure for vehicles including a pair of side walls, a bottom wall, front and rear end walls, each of said side walls comprising an elongated horizontal upper tube and a second elongated horizontal lower tube, spaced vertical tubes connecting said upper and lower tubes, brace tubes connecting said vertical tubes for bracing the side walls against vertical stresses, a pair of upwardly arched wheel well forming members secured to said lower tube adjacent the extremities thereof, vertical angle iron braces connecting said upper tube to said wheel well adjacent the front of the vehicle, a window frame secured to said upper tube and to said angle irons, said front wall comprising horizontal upper, lower and medial tubes, vertical tubes connecting said front lower and said medial tubes, a central vertical tube connecting said upper and said medial tubes, a substantially rectangular window frame comprising a continuous tube secured along its upper edge to said upper tube and along one side edge to said central vertical tube, said latter window frame constituting a front wall bracing means, brace tubes connecting said window frame to said medial tube, a channelled transverse member connecting said side walls together adjacent the forward ends of the latter, a pair of outer uprights secured to said transverse member adjacent the outer ends of the latter, a pair of inner uprights secured in spaced relation to said transverse member, a pair of horizontal members connecting said inner uprights with said outer uprights, and triangular bracing webs secured to said inner and outer uprights and to said transverse and horizintal connecting members, said inner and outer uprights and said horizontal connecting members being correlated with said front wall vertical connecting tubes in providing an engine assembly support.

2. A skeleton metal body frame structure for vehicles including a pair of side walls, a bottom wall, front and rear walls, each of said side walls comprising an elongated horizontal upper tube and a second elongated horizontal lower tube, spaced vertical tubes connecting said upper and lower tubes for bracing the side walls against vertical stresses, brace tubes connecting said vertical tubes, a pair of upwardly arched wheel well forming members secured to said lower tube adjacent the extremities thereof, vertical angle iron braces connecting said upper tube to said wheel well adjacent the front of the vehicle, a window frame secured to said upper tube and to said angle irons and providing a bracing means for the latter, said front wall comprising horizontal upper, lower and medial tubes, vertical tubes connecting said medial and said lower tubes, a central vertical tube connecting said upper and said medial tubes, a pair of window frames secured to and positioned on opposite sides of said central vertical tube and constituting a bracing means for said front wall, each of said window frames comprising a substantially rectangular, tubular, continuous frame, said window frames having their upper edges secured to said upper horizontal tube with their inner side edges secured to said central vertical tube, braces connecting the lower edges of said latter frames to said medial tube, said first window frames being secured along their front side edges to the outer side edges of said second pair of window frames, a channelled transverse member connecting said side walls together adjacent the forward ends of the latter, a pair of outer uprights secured to said transverse member adjacent the outer ends of the latter, a pair of inner uprights secured in spaced relation to said transverse member, a pair of horizontal members connecting said inner uprights with said outer uprights, and triangular bracing webs secured to said inner and outer uprights and to said transverse and horizontal connecting members, said inner and outer uprights and said horizontal connecting members being correlated with said front wall vertical connecting tubes in providing an engine assembly support.

ARTHUR R. PERKINS.